T. D. W. PINCKNEY.
POWER TRANSMISSION MECHANISM.
APPLICATION FILED FEB. 6, 1914.
1,242,974.
Patented Oct. 16, 1917.
3 SHEETS—SHEET 1.
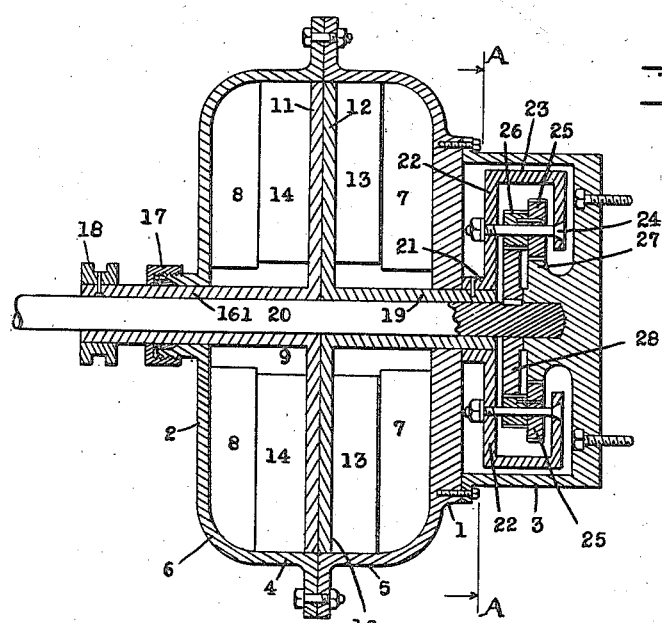
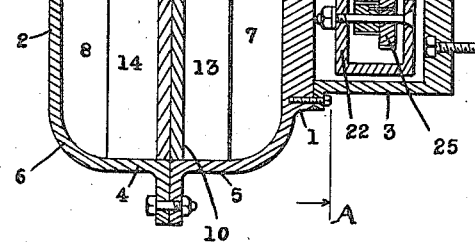
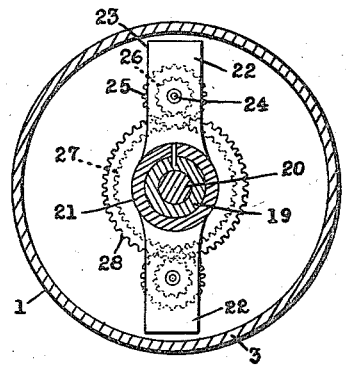
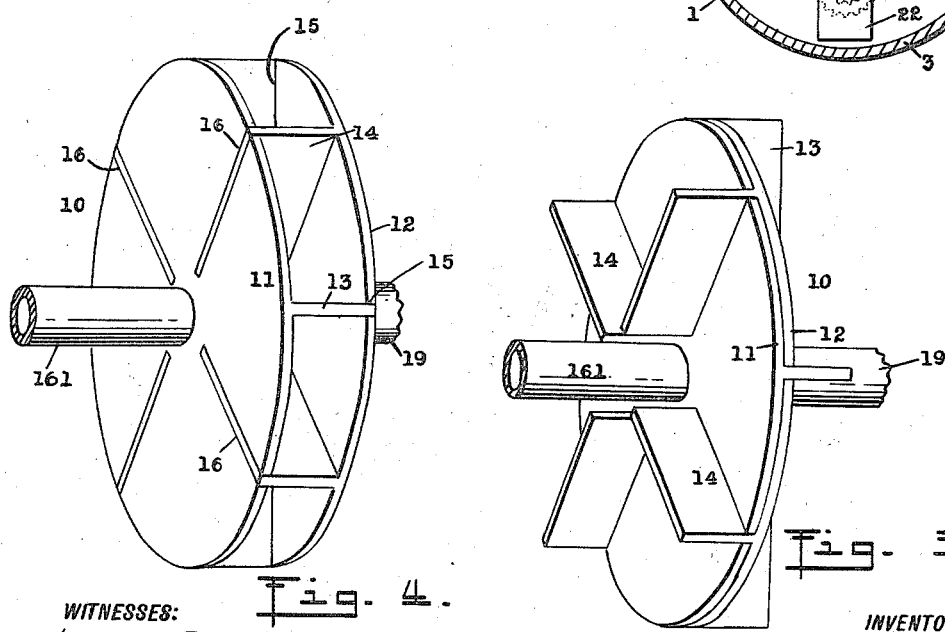
WITNESSES:
Howard P. King
Mildred E. Brooks
INVENTOR:
Thomas D. W. Pinckney.
BY Russell M. Everett,
ATTORNEY.

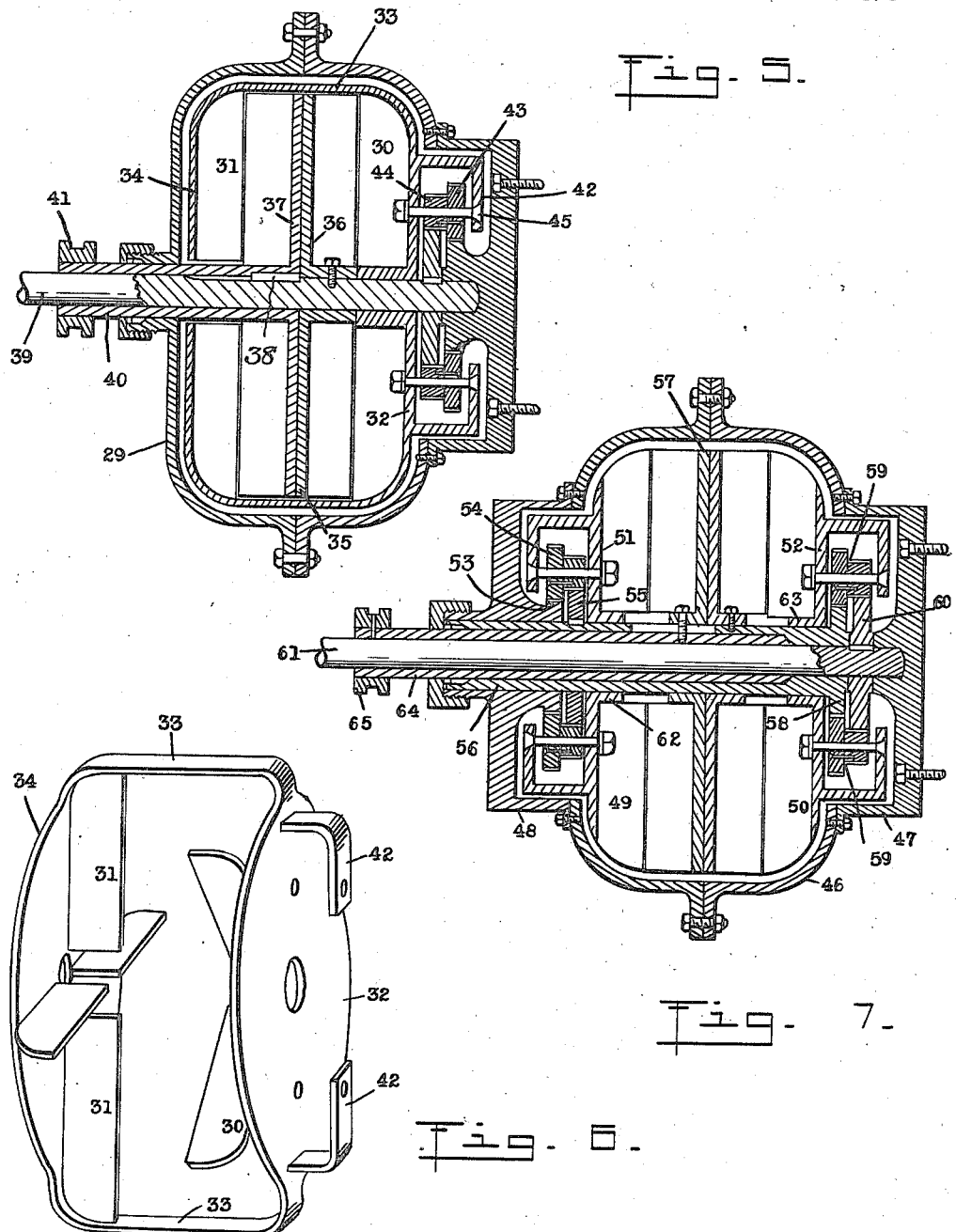

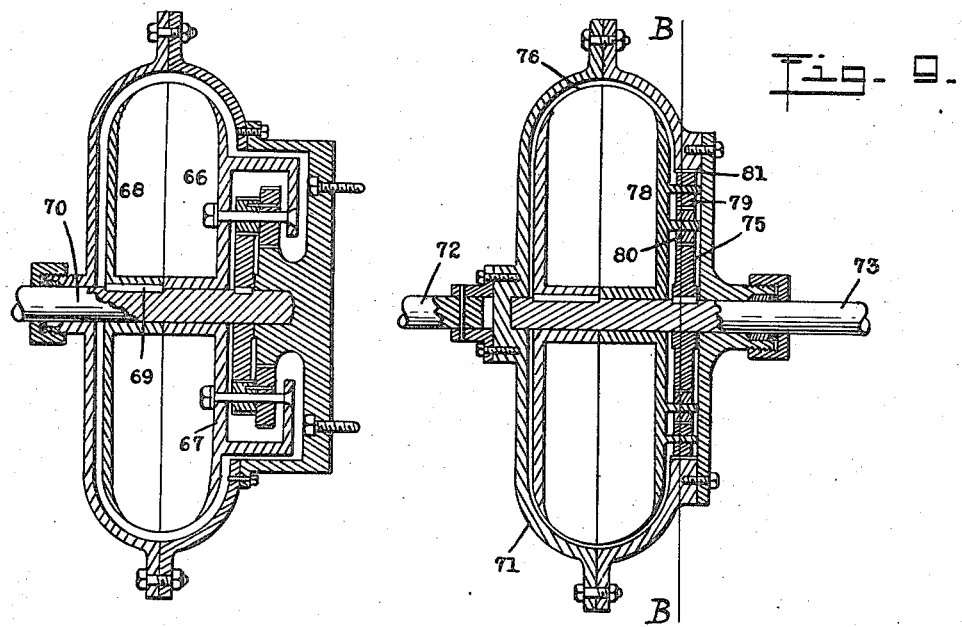
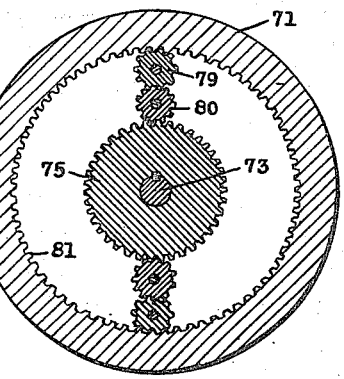
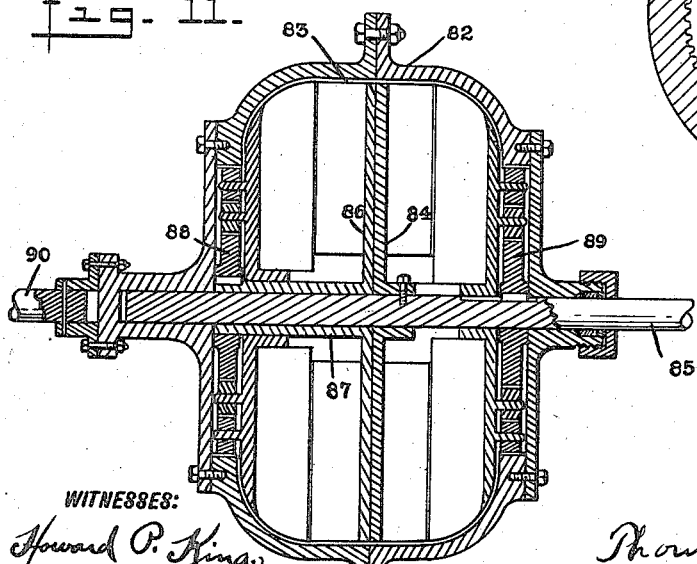

UNITED STATES PATENT OFFICE.

THOMAS D. W. PINCKNEY, OF NEW YORK, N. Y.

POWER-TRANSMISSION MECHANISM.

1,242,974.

Specification of Letters Patent.

Patented Oct. 16, 1917.

Application filed February 6, 1914. Serial No. 816,918.

*To all whom it may concern:*

Be it known that I, THOMAS D. W. PINCK-NEY, a citizen of the United States, and a resident of the city of New York, borough of Bronx, in the county of Bronx and State of New York, have invented certain Improvements in Power-Transmission Mechanisms, of which the following is a specification.
The objects of this invention are to secure transmission of power or speed by means such as differential gearing which is automatically adjustable; to secure such adjustment according to the load or the driving power, and thus vary the power or speed transmitted without any attention on the part of the driver; to obtain such automatic change of speed according to the load on the driven member; to secure more perfect adjustment than can be effected manually; to effect such adjustment without the use of any fixed outside point of resistance or fulcrum; to utilize a fluid for automatically adjusting the transmission mechanism; to provide means by which the transmission mechanism can be manually adjusted in addition to its automatic adjustment; to eliminate damage or breakage by too sudden application of power or checking of machinery; to secure a simple and durable construction which will not be liable to get out of order, and to obtain other advantages and results as may be brought out in the following description.
Referring to the accompanying drawings, in which like numerals of reference indicate the same parts throughout the several views, Figure 1 is a longitudinal central section of a fluid power transmission mechanism in which the casing and a shaft are the two members and the differential gearing is automatically adjusted from the casing;

Fig. 2 is a transverse section of the same on line A—A;
Fig. 3 is a perspective view of the paddle wheel with its sections exposed or projecting to engage the fluid to their fullest extent;

Fig. 4 is a perspective view of the paddle wheel with its sections in idle position and the blades covered or protected against engagement with the fluid;

Fig. 5 is a longitudinal central section similar to Fig. 1 but illustrating a construc- tion by which the differential gearing is automatically adjusted from the shaft;

Fig. 6 is a perspective view of the pinion support in Fig. 5;

Fig. 7 is a longitudinal central section of a transmission mechanism of the type shown in Figs. 5 and 6 provided with differential gearing at both ends of the fluid container;

Fig. 8 is a longitudinal central section of a transmission mechanism of the type shown in Figs. 5 and 6 illustrating a simplified form of fluid control mechanism;

Fig. 9 is a longitudinal central section similar to Fig. 8 but illustrating a different form of differential gearing, and showing a reduction from the shaft to the casing;

Fig. 10 is a transverse section on line B—B of Fig. 9, and

Fig. 11 is a longitudinal central section of a transmission mechanism with differential gearing of the form shown in Fig. 9 at both ends of the fluid container and provided with a manually adjustable paddle wheel.

In the specific embodiment of the invention illustrated in said drawings, and referring more especially to Figs. 1–4, inclusive, the reference numeral 1 indicates a casing or body comprising a fluid container 2 and a gear case 3, both said container and gear case being substantially cylindrical and arranged end to end upon the same longitudinal axis. For convenience of manufacture the gear case 3 is shown as separable from the fluid container and the fluid container is shown as made up of two sections 4, 5 separable upon a median transverse plane, but obviously such minor details of construction may be varied without departing from the spirit and scope of the invention. The ends of the fluid container 2 are preferably rounded at their circumferential edges, as shown at 6 in Fig. 1, and on the interior surfaces of said ends of the container are arranged radially-disposed vanes 7, 8 having their inner or facing edges spaced apart so as to provide a central space 9 within the container 2 and in which central space is arranged a paddle wheel 10. This paddle wheel is preferably made in two sections having webs 11, 12 disposed transversely within the container and adapted to lie flatwise together, said webs having radial blades 13, 14, respectively, projecting from their inner facing sides the blades of each web extending through appropriate slots 15, 16 respectively, in the other web. With the webs 11, 12 in close proximity to each other as in Figs. 1 and 3, the blades 13 of the web 11 are close to the edges of one set of vanes 7, whereas the outer edges of the blades 14 of the other web 12 are adjacent the edges of the other set of vanes 8. Projecting centrally from said web 11 upon the opposite side thereof from the attached blades 13 is a sleeve 161 which passes through an appropriate stuffing box 17 at the end of the casing or body 1 away from the gear case 3, and is provided at its exposed end with a shifting collar 18 through the agency of which the sleeve and web 11 may be shifted longitudinally. In this manner the web 11 may be moved away from the web 12, as shown in Fig. 4, so that said web 11 is adjacent to the vanes 8, and the blades 13, 14 of both of the webs are between said webs. When in this position it will be readily appreciated that if the container 2, full of fluid, is rotated, the blades 13, 14 are protected by the webs from the revolving fluid so that no impetus of revolution will be transmitted to the paddle wheel. The other web 12 is also provided with a sleeve 19 extending oppositely from its blades 14 toward and into the gear case 3, and both of said sleeves 161 and 19 are rotatably mounted upon a shaft 20 constituting the driven member and projecting from the casing or body 1 at the end thereof away from the gear case 3 while its other extremity is rotatably seated in a bearing in an inner boss on the closed end wall of the gear case.

The end of the sleeve 19 which projects into the gear case 3 has fast upon itself a hub 21 having preferably opposite radial arms 22, 22 which at their outer ends are bent parallel to the shaft 20 and then returned radially a short distance, as clearly shown in Figs. 1 and 2. The yoke 23 thus formed carries at its opposite ends similar sets of pinions 25, 26, the pinions of each set being rotatably mounted sided by side upon a stud 24 extending between an arm 22 and its returned portion, as shown, and arranged and adapted to rotate together. The larger pinion 25 meshes with a gear 27 formed on or fixed with respect to the gear case 3, while the smaller pinion 26 meshes with a gear 28 keyed to the shaft 20.

It is to be understood that in operation, the casing 1 is preferably the member to which motive energy is applied, or the prime mover, and that the shaft 20 is the driven member, and in the particular application of the device to an automobile the gear case 3 is preferably bolted directly to the fly wheel of the engine and rotates continuously therewith. Supposing a load on the driven shaft 20, if the paddle wheel sections are in the idle position shown in Fig. 4, then the engine rotating the entire casing 1 and fluid therein will drive the gear 27 and turn the pinions 25, 26 on their axes so that they will roll idly around the gear 28 on the shaft 20, said shaft standing still and the yoke 23 and paddle wheel 10 turning idly in a direction opposite that of the casing 1. No transmission whatever takes place from the driving gear 27 to the driven gear 28. But if the members of the paddle wheel 10 are shifted to close up the webs 11, 12 and expose the blades 13, 14 to the liquid revolving with its container 2, the resistance offered by said liquid to the paddle wheel 10 will retard its backward rotation. If this retardation is complete, so that the paddle wheel turns with the casing, as would happen if the load were light, then the pinions 25, 26 do not turn at all on their axes but serve simply as keys to cause the gears 27 and 28 to rotate in unison. The driven shaft 20 thus rotates as if direct-connected to the engine, and "high gear" is secured. But if the load on the driven shaft 20 is sufficient to just counteract the tendency of the liquid to carry the paddle wheel with it, then the paddle wheel and yoke 23 stand still and the pinions 25, 26 rotate on their axes transmitting motion from the gear 27 to the gear 28 at reduced speed and with increased power. This gives "low gear," and obviously between "high gear" and "low gear" there are all "intermediate gears" as the load on shaft 20 varies between the limits specified and the pinions partly drag the gear 28 and partly turn. If the load increases above that required to balance the tendency of the liquid to rotate the paddle wheel with it, obviously the pinions will begin to roll on the driven shaft gear 28 in a direction opposite that of the casing, and the over-load will cause no breakage. This will occur when any sudden resistance to the shaft 20 occurs or when the driving power is applied too suddenly, and damage from such sudden resistance or application of power will thus be prevented.

It will be observed that all the above described adjustment to different loads is automatic, or effected by the load itself without any outside or fixed point of resistance or fulcrum, and in addition to this automatic adjustment the blades of the paddle wheel 10 may be projected more or less by shifting the collar 18 so as to manually vary the range of the transmission or the load which will throw it into "low gear."

Of course substantially the same action as I have described above takes place with a constant load and varying driving power. That is to say, if we conceive the driving power at first too weak to move the load, the yoke 22 will roll idly upon the driven gear 28 and there will be no transmission, but as the driving power increases, the pinions will begin to turn more and more on their axes as the yoke revolves, and impart motion to the driven shaft, until when the yoke stands still, said pinions will be transmitting entirely by their rotary motion, at "low gear;" as the driving power increases further, the driving gear 27 will begin to drag the pinions around with it until when the yoke is turning with the casing the pinions will be standing still with reference to both driving and driven gears and there will be complete transmission at high gear.

Referring to Figs. 5 and 6 of the drawing, it will be noted that the liquid container 29 does not carry vanes as in the construction already described, but a disk 32 replaces the yoke and vanes 30 are mounted upon this disk, which also has opposite peripheral arms 33, 33 projecting longitudinally of the liquid container to carry a parallel disk 34 upon which other vanes 31 are mounted. Sufficient space is left between the vanes 30, 31 for a paddle wheel 35 similar in construction to the one heretofore described but having its member 36 fixed to the driven shaft 39 and its other member 37 keyed thereto as at 38 and adapted to slide on said shaft by means of the sleeve 40 and collar 41. Brackets 42, 42 project from the disk 32 opposite the arms 33 and between these brackets and the disk pinions 43, 44 are mounted on a shaft 45. It will readily be understood that the main difference between this construction of Figs. 5 and 6 and the construction of Figs. 1-4 is that here the vanes are on the pinion support 32 and the paddle wheel on the driven shaft, whereas in the previous construction the vanes are on the casing and the paddle wheel on the pinion support, and the result of this different construction is to connect the pinion support to the driven shaft rather than to the more rapidly turning casing or engine as in the previous case. In operation, the action is so closely analogous to that already described with reference to Figs. 1 to 4 as to be obvious without any further description here.

In Fig. 7 I have shown a transmission mechanism in which the fluid container 46 has gear cases 47, 48 containing differential gearing, at both ends of itself, each set of gearing being of the type shown in Figs. 5 and 6 with vanes 49, 50 attached to disks 51, 52. In this construction, a gear 53 on the casing at its far end from the engine meshes into pinions 54 which also mesh into a gear 55 keyed to an outside sleeve 56 which carries the paddle wheel 57 and also carries a gear 58 in the gear case 47 next the engine which meshes with the pinions 59 which also mesh with a gear 60 on the driven shaft 61. The disks 51 and 52 are both rotatably mounted by hubs 62, 63, respectively, upon the said sleeve 56, and inside the said sleeve or the end portion of the same away from the engine is an inner sleeve 64 by which one of the paddle wheel sections is slid with respect to the other by means of an outside collar 65.

In Fig. 8 I have illustrated a construction wherein vanes 66 are carried by a disk 67 and blades 68 are keyed as at 69 to the driven shaft 70. Obviously in operation this construction works similar to the construction shown in Figs. 5 and 6 except that there can be no adjustment of blades. In other words, the transmission is entirely automatic.

In Figs. 9 and 10 I have shown a casing 71 similar to the casing shown in Fig. 8 but connected to the driven shaft 72 to rotate therewith. A driving shaft 73 projects into the casing at the opposite side thereof from the driven shaft 72 and has at its inner end a bearing in the inner wall of the casing, this shaft having upon itself a gear 75 and a paddle wheel 76. Intermediate said gear 75 and paddle wheel 76 a disk is mounted rotatably upon the shaft 73 having vanes 78 facing the blades of the paddle wheel 76 and having at its opposite side outer and inner pinions 79, 80 in radial alinement and meshing with each other, the inner one also meshing with the gear wheel 75 and the outer one meshing with an internal gear 81 on the casing. Obviously there is no manual control in this form of transmission mechanism, and with a light load the driving shaft 73 turning the gear wheel 75 and paddle wheel 76 will carry the disk with it so that the pinions 79 and 80 do not turn on their studs but simply key the casing to the gear wheel 75 so as to rotate therewith, as if the shafts 72, 73 were direct-connected. When the load increases sufficiently, the disk will not keep pace with the paddle wheel 76 and the pinions 79, 80 will then come into play to transmit increased power and reduced speed to the casing 71 until the disk 78 stands still, which will be "low gear." As the load increases beyond this point, the disk will yield in a reverse direction and permit a corresponding rolling action between the outside pinion 79 and the casing gear 81, so as to avoid breakage, as clearly seen from Fig. 10.

This construction of Figs. 9 and 10 last described, it will be noted, is in effect a reversal of the construction shown in Fig. 8, so far as driving and driven parts are concerned, but geared to produce the same effect.

In Fig. 11 I have shown a transmission mechanism in which a fluid container 82 has differential gearing of the type shown in Figs. 9 and 10 at both ends of itself and has a middle paddle wheel 83 one member 84 of which is fast to the driving shaft 85 so that it can be opened and closed similar to the paddle wheel already described by sliding said driving shaft. The other member 86 of the paddle wheel is provided at its hub with a sleeve 87 which carries at the end of the casing away from the engine a gear wheel 88 outside of which are pinions the outer one of which meshes into an internal gear on the casing. At the other end of the casing is a corresponding gear 89 slidably keyed to the driving shaft 85 and meshing with pinions the outer one of which engages internal gear teeth on the casing. Obviously the operation of this transmission mechanism is similar to the one shown in Figs. 9 and 10, except that by sliding the driving shaft 85 the paddle wheel sections 84, 86 can be separated into idle position so that no transmission will take place from said shaft 85 to the driven shaft 90. It will be noted that instead of sliding the shaft 85 the casing could be slide upon said shaft, as will be understood.

While for convenience I have designated one of the transmission mechanism members as "driving" and the other as "driven," it will be understood that these terms are merely relative and that in any of the constructions shown the member described as "driven" could become the driving member and the "driving member" be driven.

The arrangement of pinions shown in Figs. 9, 10 and 11 affords a lighter and cheaper construction than the other one shown, and is also better in applying my transmission mechanism to machines already built, where space longitudinally of the shaft is limited, as obviously the pinions and gears are all in one plane.

Various other modifications than those shown can be made in the structural details of my transmission mechanism without departing from the spirit and scope of the invention, and I do not wish to be understood as limiting myself except as required by the following claims when construed in the light of the prior art.

Having thus described the invention what I claim is:—

1. In a power transmission mechanism, the combination of a casing forming a fluid container and a gear case side by side with an interior partition between, a shaft extending through the fluid container and said partition and having an interior bearing in the gear case, driving and driven gears in said gear case on said shaft and the gear case respectively, pinions in said gear case meshing with said driving and driven gears and rotatably fast with respect to each other, a support for said pinions in the gear case and coaxial with the said gears and adapted to turn independent thereof, and fluid transmission members in said fluid container one of which is connected to said support.

2. In a power transmission mechanism, the combination of a casing forming interior chambers arranged side by side, a shaft extending into said casing from one side and having an interior bearing in the wall at the opposite side, driving and driven gears in one of said chambers of the casing one of them being on said shaft and the other fast with respect to the casing, pinions in said gear chamber fast with respect to each other and meshing with said driving and driven gears respectively, a support for said pinions in the gear chamber coaxial with the gears and adapted to turn independent thereof, and fluid transmission members in the other chamber of the casing one of said members being connected to said support.

3. In a power transmission mechanism, the combination of a casing forming chambers arranged side by side, a shaft extending into said casing from one side having an interior bearing in the wall at the opposite side, driving and driven gears in the chamber adjacent said shaft bearing one of them being on said shaft and the other fast with respect to the casing, pinions in said gear chamber meshing with said driving and driven gears and fast with respect to each other, a support for said pinions in the gear chamber coaxial with the gears and shaft, and fluid transmission members in the other chamber of the casing one of said members being connected to said support.

4. In a power transmission mechanism, the combination of a casing forming interior chambers arranged side by side, a shaft extending into said casing from one side and having an interior bearing in the wall at the opposite side, driving and driven gears in one of said chambers of the casing one of them being on said shaft and the other fast with respect to the casing, pinions in said gear chamber fast with respect to each other and meshing with said driving and driven gears respectively, fluid transmission members in the other chamber of the casing, and means on one of said fluid transmission members for supporting said pinions.

5. In a power transmission mechanism, the combination with driving and driven members, of driving and driven gears on said members arranged side by side, pinions arranged side by side and of different diameter engaging said gears, a support for said pinions adapted to turn on the same axis as said gears, and a fluid controlling mechanism for controlling the turning of said support.

6. In a power transmission mechanism the combination of driving and driven members, differential gearing connecting said members, controlling mechanism for said gearing providing a fluid chamber and a part in said chamber adapted to rotate with respect thereto.

7. In a power transmission mechanism, the combination of driving and driven members, differential gearing connecting said members, controlling mechanism for said gearing providing a fluid chamber and a part in said chamber adapted to rotate with respect thereto, and means for varying the resistance of such relative rotation.

8. In a power transmission mechanism, the combination of driving and driven members, differential gearing connecting said members, controlling mechanism for said gearing providing a fluid chamber, and parts adjacent each other in said chamber adapted to rotate one with respect to the other.

9. The combination with a casing forming a central fluid container and opposite gear chambers, and driving and driven members, of sets of differential gearing in said gear chambers each connecting said driving and driven members, and fluid controlling mechanism in the middle chamber for automatically varying said gearing to vary the transmission of power.

10. In a power transmission mechanism, the combination of driving and driven members, differential gearing connecting said members, controlling mechanism for said gearing providing a fluid chamber, parts adjacent each other in said chamber adapted to rotate one with respect to the other, and means for varying the resistance to relative rotation of said parts.

11. In a power transmission mechanism, the combination of driving and driven members, differential gearing connecting said members, controlling mechanism for said gearing providing a fluid chamber, and vanes and blades adjacent each other in said chamber and connected to the gearing.

12. In a power transmission mechanism, the combination of driving and driven members, differential gearing connecting said members, controlling mechanism for said gearing providing a fluid chamber, vanes and blades adjacent each other in said chamber and connected to the gearing, and means for varying the resistance to relative rotation of said vanes and blades.

THOMAS D. W. PINCKNEY.

Witnesses:
  HOWARD P. KING,
  JANET A. AYERS.